United States Patent [19]

Nagashima

[11] Patent Number: 4,511,902
[45] Date of Patent: Apr. 16, 1985

[54] THERMAL TRANSFER TYPE PRINTING APPARATUS

[75] Inventor: Masayoshi Nagashima, Chigasaki, Japan

[73] Assignee: Tokyo Shibaura Denki Kabushiki Kaisha, Japan

[21] Appl. No.: 467,167

[22] Filed: Feb. 16, 1983

[30] Foreign Application Priority Data

Feb. 17, 1982 [JP] Japan ................................ 57-24119

[51] Int. Cl.³ .................. G01D 15/10; B41J 3/20; B41J 31/00
[52] U.S. Cl. .................. 346/76 PH; 400/120; 400/198; 400/227.1
[58] Field of Search ............ 346/76 PH; 400/120, 400/198, 227, 227.1

[56] References Cited

U.S. PATENT DOCUMENTS 4,359,748 11/1982 Pasini et al. ............... 346/76 PH
4,407,002 9/1983 Inui et al. .................. 400/227.1

FOREIGN PATENT DOCUMENTS 89992 11/1980 Japan ................................ 400/695
160160 9/1983 Japan ............................ 400/227.1

*Primary Examiner*—George H. Miller, Jr.
*Attorney, Agent, or Firm*—Cushman, Darby & Cushman

[57] ABSTRACT

A thermal transfer type printing apparatus has a thermal head unit for selectively and thermally transferring an ink layer of an ink ribbon onto a paper sheet in response to printing information. The ink layer, in which blanks of ink corresponding to the printing information remain after printing, is heated and made molten by a heat roller, and the negative image formed by these ink blanks is thus rendered illegible.

5 Claims, 4 Drawing Figures

THERMAL TRANSFER TYPE PRINTING APPARATUS

BACKGROUND OF THE INVENTION

The present invention relates to a printing apparatus and, more particularly, to a thermal transfer type printing apparatus which employs a thermal head.

A thermal transfer type printing apparatus was developed because of its advantageously small size and weight as well as its maintenance-free operation, and this kind of apparatus has been used, for example, in association with a facsimile or a copying apparatus. However, this thermal transfer type printing apparatus prints by transferring an ink layer from an ink ribbon onto a paper sheet in accordance with printing information. Therefore, a negative image corresponding to the printing information is formed on the ink ribbon thus transferred, and the printing information can be easily read from a discarded ink ribbon. Consequently, the printing information might be secretly or improperly transmitted by means of a used ink ribbon.

SUMMARY OF THE INVENTION

It is an object of the present invention to provide a thermal transfer type printing apparatus in which a negative image of an ink ribbon is formed which cannot be visually read from the transferred ribbon.

According to an aspect of the present invention, there is provided a thermal transfer type printing apparatus having means for erasing at least the transferred part of this ink ribbon after an ink layer is thermally transferred from the ribbon to a paper sheet via a thermal head.

DETAILED DESCRIPTION OF THE PREFERRED EMBODIMENTS

Figure 1:
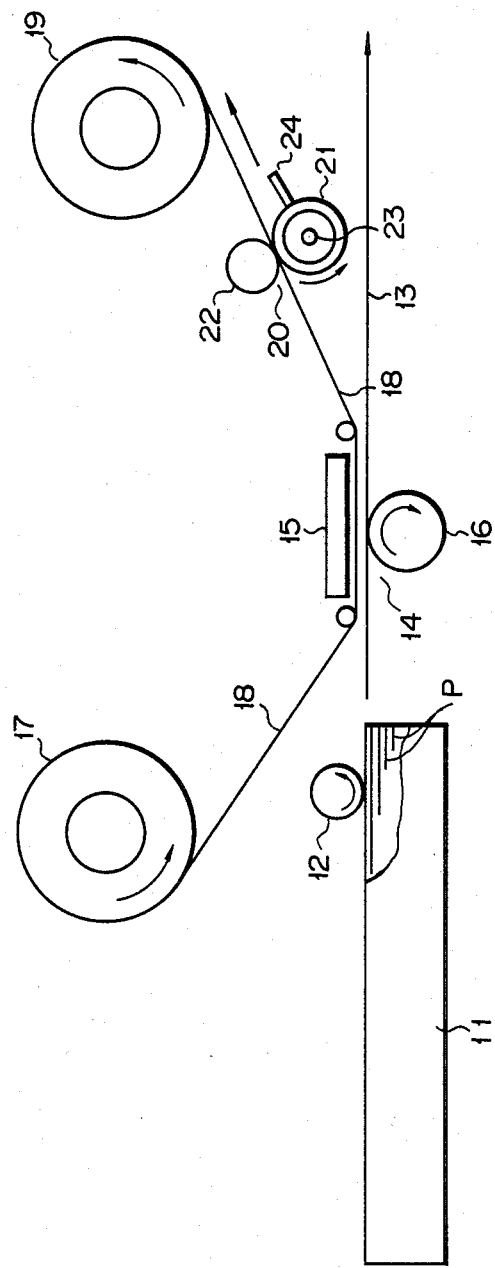
FIG. 1 is a schematic structural view of a thermal transfer type printing apparatus according to an embodiment of the present invention.

A first embodiment of a thermal transfer type printing apparatus according to the present invention will be described in detail with reference to FIG. 1, which shows a construction of a thermal transfer type printing apparatus. According to this construction, paper sheets P are contained in a paper cassette 11, and a paper feed roller 12 is contacted under pressure on the top of the sheets P. The paper feed roller 12 is rotated to deliver a paper sheet P to a conveying passage 13 A print section 14 is arranged at the passage 13. The thermal head unit 15 and lead roller 16 of the print section 14 are disposed opposite each other along the passage 13. An ink ribbon 18 is inserted from an ink ribbon feed reel 17 to a space between the head unit 15 and the roller 16. This ribbon 18 is then wound on an ink ribbon take-up reel 19. The ribbon 18 is manufactured by forming an ink layer which is made of wax, dye and resin on a thin condenser paper sheet. An erasing device 20 is arranged between the section 14 and the reel 19. This device 20 is composed of a heat roller 21 and a press roller 22 which are arranged opposite each other with the ribbon 18 in between. A heater 23 is arranged in the roller 21, and the surface of the roller 21 contacts the ink layer of the ribbon 18. A cleaning blade 24 contacts the surface of the roller 21 under pressure. Teflon or silicon rubber is coated on the surface of the roller 22.

Figure 2:
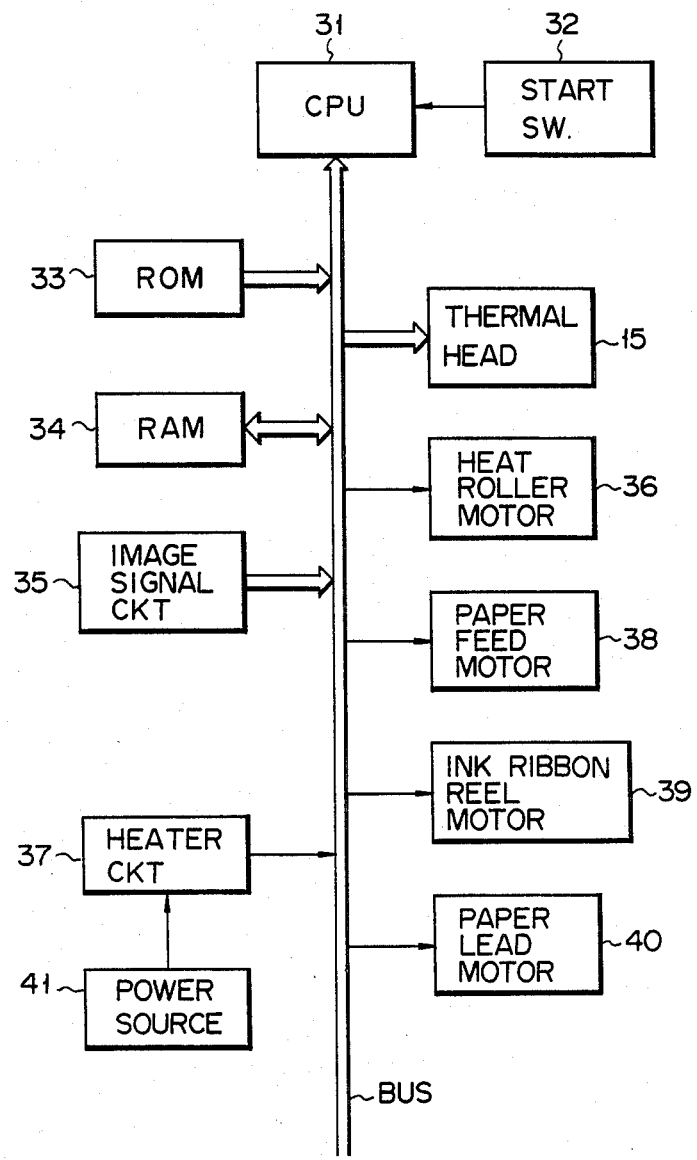
FIG. 2 is a block circuit diagram of the printing apparatus in FIG. 1.
Figure 3:
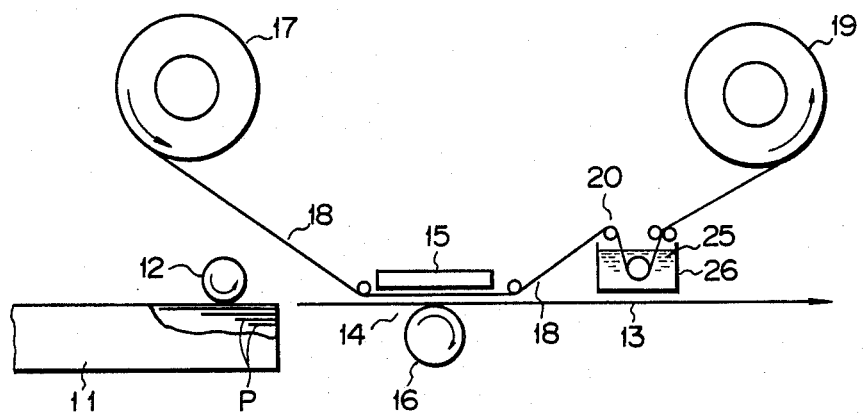
FIG. 3 is a schematic structural view of the printing apparatus according to another embodiment of the present invention and having an erasing device with a solvent.
Figure 4:
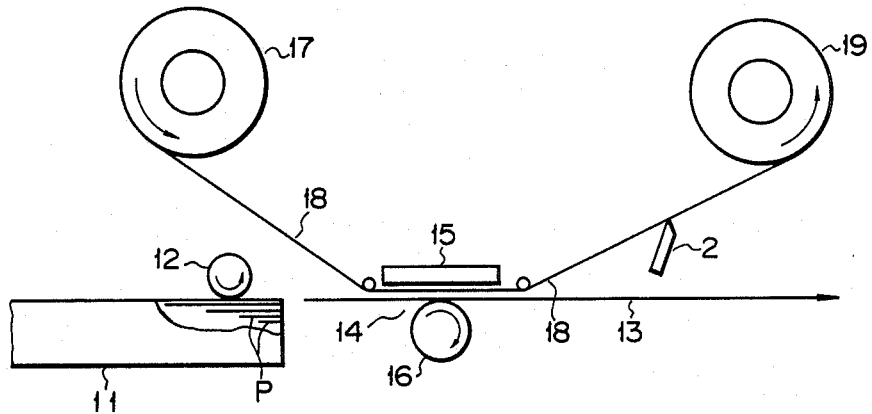
FIG. 4 is a schematic structural view of the printing apparatus according to still another embodiment of the invention and having a mechanical erasing device.

According to a circuit of the printing apparatus in FIG. 2, a CPU 31 is connected to a start switch 32, and is also connected through a bus to a ROM 33 and a RAM 34. A program for performing a printing operation is stored in the ROM 33, and various data are stored in the RAM 34. An image signal circuit 35 is connected to the bus. This circuit 35 produces an image signal corresponding to information to be printed, and is, for example, composed of a scanner of an electrophotographic apparatus or an image data memory of a facsimile apparatus. The circuit 35 is connected through the bus to a thermal head unit. Also connected to the bus are a heat roller motor 36, a heater circuit 37, a paper feed motor 38, an ink ribbon reel motor 39 and a paper lead motor 40. A power source 41 is connected to the circuit 37.

The operation of the printing apparatus of this embodiment will now be described.

When the power source 41 is turned on, the heater 23 of the circuit 37 is heated. When the roller 21 reaches a predetermined temperature due to the heat of the heater 23, the printing apparatus enters the ready state. When the switch 32 is operated at this time, the CPU 31 carries out the printing program of the ROM 33. In other words, the CPU 31 drives the motor 38 to deliver the sheet P of the cassette 11 via the roller 12 to the passage 13. When the sheet P is conveyed along the passage 13 to the print section 14, the ribbon 18 and the sheet P are contacted under pressure between the thermal head of the heat unit 15 and the roller 16. Then, the CPU 31 transfers the image signal of the circuit 35 to the heat unit 15. The unit 15 is driven in response to the image signal, and the heating elements of the head are selectively operated in response to the signal. In this manner, the ink layer of the ribbon 18 is transferred onto the sheet P. The motors 36, 39 and 40 are driven at this time, whereby the roller 16, the reel 19 and the roller 21 are rotated. Thus, the sheet P is delivered together with the ribbon 18. The ink layer of the ribbon 18 is sequentially transferred to the sheet P by the head unit 15 in response to the printing information in this state, wherein a dot print pattern is formed in response to the information on the sheet P. Then, the sheet P is isolated from the ribbon 18, and is conveyed to a discharging section.

Ink blanks corresponding to the printing information are formed on the ribbon 18 thus transferred, and remain on the ribbon 18 as a negative image. When this ribbon 18 passes between the rollers 22 and 21, the ink layer of the ribbon 18 is melted by the heat of the roller 21, so that the negative image is thus erased. In this case, the roller 21 is rotated in a direction opposite to the feeding direction of the ribbon 18, as shown by an arrow in the drawing. Accordingly, the erasing effect on the negative image of the ink layer is increased by the friction between the ribbon 18 and the roller 21. Thus, the negative image of the ribbon 18 fed through the device 20 can be almost completely erased and can become totally illegible. Though the molten ink is at first adhered on the roller 21, this is removed from the roller 21 by the blade 24.

In another embodiment of the printing apparatus of the invention, the erasing device 20 is composed of a melting tank 26 in which a solvent 25 is stored. The ribbon 18 is dipped in the solvent 25 of the tank 26, and is then wound on the reel 19. When the ribbon 18 is dipped in the solvent 25, the ink layer is dissolved into the solvent and the negative image of the ribbon 18 ink pattern corresponding to the printing information is erased.

In still another embodiment of the printing apparatus of the invention, a scraper 27 is employed as the erasing device. The ink layer of the ribbon 18 is scraped by this scraper 27, whereby the negative image is rendered illegible.

As described above, according to the present invention, there is provided an erasing device for erasing the negative image which remains on the ink ribbon after thermal printing has taken place. Therefore, printing information can no longer be read from the used ribbon, and the privacy of the information can be secured.

In the embodiment exemplified in FIG. 1, a heat roller is employed. However, a mere heat plate may be used instead of the roller.

What we claim is:

1. A thermal transfer type printing apparatus which comprises:
    means for conveying a paper sheet along a conveying path in a conveyance direction;
    ribbon means for containing an ink medium formed with an ink layer;
    a printing section arranged at said path and having thermal head means which contacts the ink layer of said ink medium contacted with said sheet and is driven in response to printing information for selectively and thermally transferring said ink layer onto said sheet in response to said information; and
    erasing means for erasing at least blanks of the ink layer which correspond to said information remaining on said ink medium thus transferred so as to render said information illegible, said erasing means including a press roller in opposing relationship to a heat roller, said press and heat rollers arranged along said path downstream of said printing section, said ribbon means passing between said press and heat rollers so that said ink layer is in contact with said heat roller, said heat roller including heating means for heating and thus melting the ink layer of said ribbon means and being rotated in a direction opposite to said conveyance direction to generate friction between said ribbon means and said heat roller for increasing the erasing effect of said erasing means.

2. The apparatus according to claim 1, wherein said erasing means further includes scraping means in contact with said heat roller for scraping the ink layer of said ink medium transferred onto said heat roller.

3. A thermal transfer type printing apparatus comprising:
    means for conveying a paper sheet along a conveying passage;
    means for containing an ink medium formed with an ink layer;
    a printing section arranged at said passage and having thermal head means which contacts the ink layer of said ink medium contacted with said sheet and is driven in response to printing information for selectively and thermally transferring said ink layer onto said sheet in response to said information; and
    erasing means including a solvent tank in which a solvent is stored and means for dipping the ink medium passed through said printing section into said solvent tank for dissolving the ink layer remaining on said ink medium into the solvent to erase ink pattern corresponding to the printing information on the ink medium.

4. The thermal transfer type printing apparatus according to claim 3, wherein said means for containing an ink medium comprises an ink ribbon feed reel on which an ink ribbon is wound, said ink ribbon including a condenser paper sheet and an ink layer coated on the condenser paper sheet.

5. The thermal transfer type printing apparatus according to claim 4, wherein said ink layer is made of wax, dye and resin.

* * * * *